Patented Sept. 20, 1938

2,130,985

UNITED STATES PATENT OFFICE 2,130,985

PROCESS OF PREPARING THYROXIN

Carl Ludwig Lautenschläger, Willy Ludwig, and Paul von Mutzenbecher, Frankfort-on-the-Main, Germany, assignors to Winthrop Chemical Company, Inc., New York, N. Y., a corporation of New York No Drawing. Application March 9, 1937, Serial No. 129,964. In Germany March 13, 1936

5 Claims. (Cl. 260—518)

The present invention relates to a process of preparing thyroxin, more particularly to the production of thyroxin from iodinated protein by a hydrolytic decomposition.

Now we have found that the thyroxin may be obtained in a good yield in the following simple manner: To an aqueous solution of protein of any kind and origin in water at an elevated temperature, i. e., at about 40° C. and at a feebly alkaline reaction, for instance, at a pH-value of about 7 to about 9, there is gradually added in small portions pulverized iodine, i. e., in a quantity not sufficient for the complete iodination of the protein. The iodinated protein thus obtained is hydrolyzed, for instance by a treatment with barium hydroxide solution of 40 per cent strength during about 18 hours. The substance containing thyroxin is precipitated from the hydrolyzate by means of an acid, for instance hydrochloric acid, sulfuric acid or acetic acid and from the precipitate the thyroxin is obtained in a pure state by recrystallization of the precipitate, for instance from a solution of sodium carbonate, and by precipitation, for instance from a solution of the recrystallized precipitate in hot alkaline alcohol of 80 per cent strength with acetic acid.

The hitherto known processes by which iodinated proteins are decomposed and the activity of the acid-insoluble fraction of the hydrolyzate on thyroid glands was ascertained have not led to the production of thyroxin. In contradistinction thereto the present invention is based on the observation that both the yield and also the purity of the active fraction depends on the method and the degree of the iodination and that also the possibility of preparing the thyroxin from this fraction is determined by these conditions. A great number of iodinated proteins have been examined but in spite of the great activity of the acid-insoluble fraction no thyroxin-crystals have been obtained. The process described above therefore shows for the first time a method of preparing thyroxin from iodinated protein in a satisfactory yield.

The following examples serve to illustrate the invention, but they are not intended to limit it thereto.

(1) 100 grams of serum globulin, purified by reprecipitating it several times with a half-saturated ammonium sulfate solution, are mixed in a solution of 2.5 per cent strength with about 15 grams of sodium bicarbonate and the mixture is heated to 40° C. 10 grams of finely pulverized iodine are introduced in small portions within 6 hours, while stirring, during which process the iodinated globulin separates in flakes. The reaction mixture is still maintained during 24 hours at 40° C. and the iodinated globulin is centrifuged, dissolved in water and dialyzed until the iodine reaction disappears in the outer water. The dialyzate is frozen and dried under reduced pressure over sulfuric acid. The iodinated globulin contains 3.5 per cent of iodine and has a strong weight-reducing action in the experiment on an animal (200 guinea pig units per gram).

100 grams of the iodinated globulin thus obtained are boiled for 18 hours in 1 liter of barium hydroxide solution of 40 per cent strength. The hydrolyzate is filtered in the hot state, the precipitate is washed with dilute hydrochloric acid at a reaction just acid to Congo paper, centrifuged and the solid matter extracted in the hot state with an alkaline sodium sulfate solution. The filtrate of the hydrolyzate is cooled, filtered with suction from the barium hydroxide which has separated, acidified with dilute hydrochloric acid until the flocculation is complete (pH=4 to 5) and the whole is allowed to deposit. The precipitate thus obtained is centrifuged and dissolved with the extract prepared by the alkaline sodium sulfate solution, the barium sulfate thus precipitated is separated and the boiling solution is acidified with dilute sulfuric acid to a pH-value of about 5. After cooling the whole is filtered with suction and washed with dilute acetic acid.

This intermediate product contains about 30 per cent of iodine and shows all the effects of the thyroid gland hormone (15,000 to 25,000 guinea pig units per gram). The yield is 2.4 grams.

If 1 gram of this substance is boiled in a sodium carbonate solution of 0.5 per cent strength and the opalescent solution is allowed to cool the sodium salt of the thyroxin separates in the form of a finely granulated precipitate in a quantity of about 0.15 gram. This precipitate is dissolved in an alkaline alcohol of 80 per cent strength and acidified in the hot state with acetic acid. The thyroxin soon separates in the form of needles or globular nodules. It decomposes at 232° C.

(2) 100 grams of casein are dissolved with 30 grams of sodium bicarbonate in 4 liters of water, the solution is heated to 40° C. and strongly stirred. Finely pulverized iodine is added thereto in portions of 5 grams each at intervals of 1 hour until 20 grams have been added in all. The solution is stirred for 24 hours at 40° C., then cooled, precipitated with dilute hydrochloric acid and the precipitated product is centrifuged. The precipitate is as finely distributed in 2 liters of water as possible and dissolved by addition of caustic soda solution. The solution is dialyzed against flowing water until iodine is no longer to be found in the solution. The whole is then stirred into the same volume of alcohol acidified with glacial acetic acid, filtered with suction and washed with alcohol. After drying under reduced pressure an iodinated casein is obtained containing 7.4 per cent of iodine (125 guinea pig units per gram). The yield amounts to about 90 per cent.

100 grams of this product are worked up as described above. 1.7 grams of intermediate product are obtained containing 45 per cent of iodine and having 20,000 guinea pig units per gram. 1 gram of this substance recrystallized from sodium carbonate and alcohol as described above yields the thyroxin which by further recrystallization is completely purified. It decomposes at 232° C. and contains 64.5 per cent of iodine and 1.75 per cent of nitrogen.

(3) 1250 cc. of a stock solution of 8 per cent strength of edestin in a sodium chloride solution of 10 per cent strength (=100 grams of edestin) are diluted with 2.75 liters of sodium chloride solution of 10 per cent strength, 30 grams of sodium bicarbonate are added and the solution is stirred at 40° C. At intervals of 15 minutes 0.5 gram of pulverized iodine is added—20 portions in all—and the reaction mixture is then maintained during the night at 40° C. The whole is now cooled, precipitated with hydrochloric acid, the precipitate is dissolved in water, freed from iodine by a dialysis, separated by the addition of alcohol and acetic acid and dried under reduced pressure. The yield amounts to 105 grams, containing 1.8 per cent of iodine.

100 grams of this iodinated edestin are boiled under reflux with 1 liter of 2N-caustic soda solution for 18 hours, the solution is filtered and adjusted to a pH-value of 5. The precipitate is separated, dissolved with a small quantity of lye and adjusted while boiling to a pH-value of 5 with dilute sulfuric acid. After cooling the precipitate is filtered with suction and washed until free from sulfate. The yield amounts to 0.3 gram, containing 40 per cent of iodine and having 5000 guinea pig units per gram.

1 gram of this product is dissolved in 5 cc. of N-caustic soda solution, alcohol of 70 per cent strength is added and the whole is acidified with acetic acid. Four times the volume of acetone is then added, the precipitate thus produced is separated by centrifuging and the liquid is diluted with 1.5 liters of water. The finely flocculent precipitate obtained during this process is separated and dissolved by boiling it in a sodium carbonate solution of 0.5 per cent strength. On cooling the sodium salt of the thyroxin precipitates; it is dissolved in an alkaline alcohol of 70 per cent strength and the solution is acidified in the hot state with acetic acid. The thyroxin separates in a crystalline form.

We claim:

1. Process of preparing thyroxin which comprises gradually adding in small portions iodine in a quantity which in all is not sufficient for the complete iodination of the protein to an aqueous solution of protein of a pH-value of about 7 to about 9 and at a temperature of about 40° C., separating the thyroxin from the iodinated protein by hydrolysis, precipitating it with an acid and purifying it by recrystallization.

2. Process of preparing thyroxin which comprises gradually adding in small portions iodine in a quantity which in all is not sufficient for the complete iodination of the protein to an aqueous solution of protein of a pH-value of about 7 to about 9 and at a temperature of about 40° C., separating the thyroxin from the iodinated protein by the hydrolyzing action of barium hydroxide, precipitating it with hydrochloric acid and purifying it by recrystallization.

3. Process of preparing thyroxin which comprises gradually adding in small portions iodine in a quantity which in all is not sufficient for the complete iodination of the protein to an aqueous solution of casein containing sodium bicarbonate of a pH-value of about 7 to about 9 and at a temperature of about 40° C., separating the thyroxin from the iodinated casein by the hydrolyzing action of barium hydroxide, precipitating it with hydrochloric acid and purifying it by recrystallization.

4. Process of preparing thyroxin which comprises gradually adding in small portions iodine in a quantity which in all is not sufficient for the complete iodination of the protein to an aqueous solution of serum globulin containing sodium bicarbonate of a pH-value of about 7 to about 9 and at a temperature of about 40° C., separating the thyroxin from the iodinated serum globulin by the hydrolyzing action of barium hydroxide, precipitating it with hydrochloric acid and purifying it by recrystallization.

5. Process of preparing thyroxin which comprises gradually adding in small portions iodine in a quantity which in all is not sufficient for the complete iodination of the protein to an aqueous solution of edestin containing sodium bicarbonate of a pH-value of about 7 to about 9 and at a temperature of about 40° C., separating the thyroxin from the iodinated edestin by the hydrolyzing action of caustic soda solution, precipitating it with sulfuric acid and purifying it by recrystallization.

CARL LUDWIG LAUTENSCHLÄGER.
WILLY LUDWIG.
PAUL VON MUTZENBECHER.